United States Patent
Kim et al.

(10) Patent No.: US 10,026,952 B2
(45) Date of Patent: Jul. 17, 2018

(54) METHOD OF MANUFACTURING ELECTRODE FOR LITHIUM SECONDARY BATTERY AND ELECTRODE MANUFACTURED USING THE SAME

(71) Applicant: LG Chem, Ltd., Seoul (KR)

(72) Inventors: Daehong Kim, Daejeon (KR); Seong Min Lee, Seoul (KR); Min Hee Lee, Gyeonggi-do (KR)

(73) Assignee: LG Chem, Ltd. (KR)

( * ) Notice: Subject to any disclaimer, the term of this patent is extended or adjusted under 35 U.S.C. 154(b) by 698 days.

(21) Appl. No.: 14/457,197

(22) Filed: Aug. 12, 2014

(65) Prior Publication Data
US 2014/0349171 A1 Nov. 27, 2014

Related U.S. Application Data

(63) Continuation of application No. PCT/KR2013/003177, filed on Apr. 16, 2013.

(30) Foreign Application Priority Data

Apr. 16, 2012 (KR) .................. 10-2012-0039114

(51) Int. Cl.
*H01M 4/04* (2006.01)
*H01M 4/1391* (2010.01)
(Continued)

(52) U.S. Cl.
CPC .......... *H01M 4/0404* (2013.01); *H01M 4/04* (2013.01); *H01M 4/0438* (2013.01);
(Continued)

(58) Field of Classification Search
None
See application file for complete search history.

(56) References Cited

U.S. PATENT DOCUMENTS 6,887,511 B1    5/2005  Shima et al.
2002/0102348 A1*  8/2002  Yagi ................... H01M 4/0426
                                               427/58
(Continued)

FOREIGN PATENT DOCUMENTS

CN          1551385        12/2004
CN       102130363 A        7/2011
(Continued)

OTHER PUBLICATIONS

Kanamura, et al., "Electrochemical reaction of 5 V cathode LiNi0.4Mn1.6O4." Science Direct; Solid State Ionis, vol. 177 (2006), pp. 113-119.
(Continued)

*Primary Examiner* — Daniel S Gatewood
(74) *Attorney, Agent, or Firm* — Lerner, David, Littenberg, Krumholz & Mentlik, LLP

(57) ABSTRACT

Disclosed are a method of manufacturing an electrode for secondary batteries that includes surface-treating a current collector so as to have a morphology wherein a surface roughness $R_a$ of 0.001 µm to 10 µm is formed over the entire surface thereof, wherein the surface-treating is performed by chemical or electrical etching using a wet method or by reactive gas or ion etching using a dry method to enhance adhesion between an electrode active material and the current collector and an electrode for secondary batteries that is manufactured using the method.

10 Claims, 1 Drawing Sheet

(51) Int. Cl.
   *H01M 4/139* (2010.01)
   *H01M 4/505* (2010.01)
   *H01M 4/525* (2010.01)
   *H01M 4/485* (2010.01)
   *H01M 4/70* (2006.01)

(52) U.S. Cl.
   CPC ......... *H01M 4/139* (2013.01); *H01M 4/1391* (2013.01); *H01M 4/485* (2013.01); *H01M 4/505* (2013.01); *H01M 4/70* (2013.01); *H01M 4/525* (2013.01); *H01M 2220/30* (2013.01)

(56) References Cited

U.S. PATENT DOCUMENTS

| | | | |
|---|---|---|---|
| 2004/0234858 A1* | 11/2004 | Torimae | H01M 4/136 429/231.95 |
| 2007/0007239 A1* | 1/2007 | Lee | H01M 4/0421 216/13 |
| 2009/0098457 A1 | 4/2009 | Kwon et al. | |
| 2010/0143773 A1 | 6/2010 | Honbou | |
| 2011/0076563 A1 | 3/2011 | Nagata et al. | |
| 2013/0122373 A1* | 5/2013 | Tamura | H01M 4/485 429/221 |

FOREIGN PATENT DOCUMENTS

| | | |
|---|---|---|
| JP | 2001-210324 A | 8/2001 |
| JP | 2002260637 A | 9/2002 |
| JP | 2003007305 A | 1/2003 |
| JP | 2005002371 A | 1/2005 |
| JP | 2008512838 A | 4/2008 |
| JP | 2008210564 A | 9/2008 |
| JP | 2008282797 A | 11/2008 |
| JP | 2009038017 A | 2/2009 |
| JP | 2010033769 A | 2/2010 |
| JP | 2010033782 A | 2/2010 |
| JP | 2010135170 A | 6/2010 |
| JP | 2011089969 A | 5/2011 |
| JP | 2012033279 A | 2/2012 |
| KR | 20060023899 A | 3/2006 |
| KR | 20090038309 A | 4/2009 |
| KR | 20100086733 A | 8/2010 |
| KR | 2011-0035915 A | 4/2011 |
| KR | 20110118129 A | 10/2011 |
| WO | 2006028316 A1 | 3/2006 |
| WO | WO 2012014793 A1 * | 2/2012 ............ H01M 4/485 |

OTHER PUBLICATIONS

Partial Search Report from European Application No. 13 77 8476, dated Sep. 2, 2015.
International Search Report for PCT/KR2013/003177 dated Jul. 25, 2013.
Ogumi, Z., Lithium secondary battery, Ltd. Ohmsha, Mar. 20, 2008, pp. 88, 96,137,138, First Edition.
Kanemura, K., Lithium-ion batteries for automotive, Nikkan Kogyo Shimbun, Dec. 20, 2010, pp. 102-103, First Edition.
Tatsumi, K. et al., Battery innovation open up the next generation power, Ltd. NTS, Feb. 1, 2006, p. 475, First Edition.

* cited by examiner

[FIG. 1]
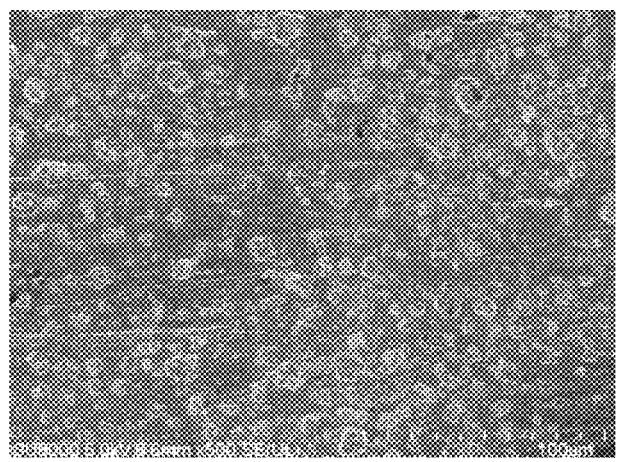
[FIG. 2]
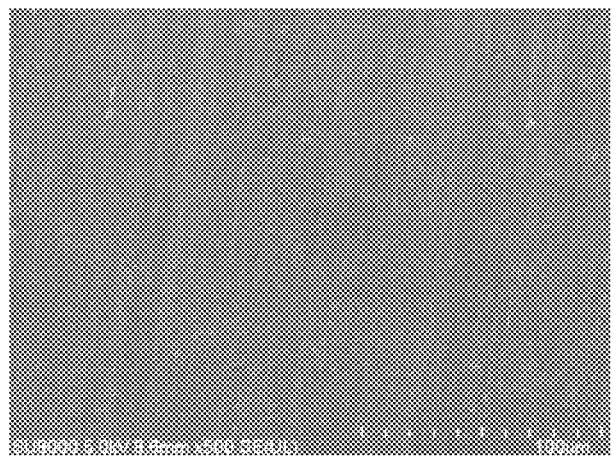

METHOD OF MANUFACTURING ELECTRODE FOR LITHIUM SECONDARY BATTERY AND ELECTRODE MANUFACTURED USING THE SAME

CROSS-REFERENCE TO RELATED APPLICATIONS

The present application is a continuation of International Application No. PCT/KR2013/003177 filed on Apr. 16, 2013, which claims the benefit of Korean Patent Application No. 10-2012-0039114, filed on Apr. 16, 2012, the disclosures of which are incorporated herein by reference.

TECHNICAL FIELD

The present invention relates to a method of manufacturing an electrode for secondary batteries in which an electrode active material is coated on a current collector and an electrode manufactured using the same and, more particularly, to a method of manufacturing an electrode for secondary batteries that includes surface-treating a current collector so as to have a morphology wherein a surface roughness $R_a$ of 0.001 μm to 10 μm is formed over the entire surface thereof, wherein the surface-treating is performed by chemical or electrical etching using a wet method or by reactive gas or ion etching using a dry method to enhance adhesion between an electrode active material and the current collector and an electrode manufactured using the same.

BACKGROUND ART

As mobile device technology continues to develop and demand therefor continues to increase, demand for secondary batteries as energy sources is rapidly increasing. Among these secondary batteries, lithium secondary batteries, which have high energy density and operating voltage, long cycle lifespan, and low self-discharge rate, are commercially available and widely used.

In addition, as interest in environmental problems is recently increasing, research into electric vehicles (EVs), hybrid EVs (HEVs), and the like that can replace vehicles using fossil fuels, such as gasoline vehicles, diesel vehicles, and the like, which are one of the main causes of air pollution, is actively underway. As a power source of EVs, HEVs, and the like, a nickel metal-hydride secondary battery is mainly used. However, research into lithium secondary batteries having high energy density, high discharge voltage and output stability is actively underway and some lithium secondary batteries are commercially available.

A lithium secondary battery has a structure in which an electrode assembly, in which a porous separator is interposed between a cathode and an anode, each of which includes an active material coated on an electrode current collector, is impregnated with a lithium salt-containing non-aqueous electrolyte.

In such lithium secondary batteries, charging and discharging processes are performed while lithium ions of a cathode are repeatedly intercalated into and deintercalacted from an anode. Although there are differences in theoretical capacities of batteries according to kinds of electrode active materials, in most cases, charge and discharge capacities are deteriorated as cycles proceed.

Such phenomenon is mainly attributed to non-functioning of active materials due to separation of electrode active material components or separation between an electrode active material and a current collector by change in volume of an electrode occurring as charging and discharging of a battery proceed. In addition, in the intercalation and deintercalation processes, lithium ions intercalated into an anode are unable to be properly deintercalated therefrom and thus an anode active site is reduced and, accordingly, charge and discharge capacities and lifespan characteristics of a battery are deteriorated as cycles proceed.

With regard to this, binders provide adhesion between electrode active materials and adhesion between an electrode active material and an electrode current collector and suppress volumetric expansion according to charging and discharging of a battery, which is an important factor determining battery performance.

However, when a large amount of binder is used during manufacture of a secondary battery to enhance adhesion, the amount of a conductive material or an electrode active material relatively decreases and thus conductivity of an electrode is reduced or battery capacity is reduced. In addition, if an electrode slurry is too dilute, it is not easy to perform coating of an electrode.

Therefore, there is an urgent need to develop technology of using an appropriate amount of binder and imparting high adhesion between an electrode active material and a current collector, whereby secondary battery performance may be enhanced.

DISCLOSURE

Technical Problem

The present invention aims to address the aforementioned problems of the related art and to achieve technical goals that have long been sought.

As a result of a variety of extensive and intensive studies and experiments, the inventors of the present invention confirmed that, as described below, when a current collector is entirely surface-treated by chemical or electrical etching using a wet method or by reactive gas or ion etching using a dry method so as to have a particular morphology and then coated with an electrode mixture, desired effects may be achieved, thus completing the present invention.

Technical Solution

In accordance with one aspect of the present invention, provided is a method of manufacturing an electrode for secondary batteries in which an electrode active material is coated on a current collector, the method including surface-treating the current collector so as to have a morphology wherein a surface roughness $R_a$ of 0.001 μm to 10 μm is formed over the entire surface thereof, wherein the surface-treating is performed by chemical or electrical etching using a wet method or by reactive gas or ion etching using a dry method to enhance adhesion between the electrode active material and the current collector.

In general, an electrode mixture is prepared in the form of a slurry obtained by mixing an electrode active material, a conductive material, a binder, and the like with an organic solvent. In this case, as described above, to prevent an electrode active material and a current collector from being separated from each other according to change in volume of an electrode occurring during charge and discharge, the amount of binder is increased and, in this case, the amount of the electrode active material or the conductive material relatively decreases and thus conductivity of an electrode is reduced or battery capacity is reduced.

Thus, the current collector surface-treated so as to have a predetermined morphology using the manufacturing method according to the present invention is provided at a surface thereof with fine irregularities and thus has an increased surface area. Accordingly, adhesion between an electrode active material and a current collector is significantly increased and thus overall performance of a secondary battery, such as charging and discharging cycle characteristics and the like, may be enhanced.

In particular, the current collector may have a morphology wherein a surface roughness $R_a$ of 0.1 μm to 1 μm is formed over the entire surface thereof.

When the surface roughness is too small, it is difficult to form fine irregularities and thus it may be difficult to distribute stress when the volume of an electrode active material expands. On the other hand, when the surface roughness is too great, distribution and alleviation effects of stress of an electrode active material in largely formed irregularities may be reduced.

In particular, an interval between the irregularities formed at the surface of the current collector may be 0.001 μm to 10 μm, and the depth of a valley between the irregularities may be 0.001 μm to 10 μm.

A method of forming fine irregularities through surface treatment of the current collector is not particularly limited. In an embodiment, when chemical etching is performed, a mixture of $FeCl_3/HCl/H_2O$ may be used. In particular, when a Cu or Ni current collector is used, a mixture of $FeCl_3/HCl/H_2O$ (in a volume ratio of 1:8.5:33.7 (vol %)) may be used as an etchant. Etching time may vary according to various factors such as kind of an anode current collector, kind of an etchant, and the like and thus may be determined such that the above-described surface morphology is formed in consideration of these factors.

The present invention also provides an electrode for secondary batteries manufactured using the manufacturing method described above. The electrode may be at least one of a cathode and an anode.

The cathode may include, as a cathode active material, a spinel-structure lithium metal oxide represented by Formula 1 below:

$$Li_xM_yMn_{2-y}O_{4-z}A_z \qquad (1)$$

wherein $0.9 \leq x \leq 1.2$, $0 < y < 2$, and $0 \leq z < 0.2$; M is at least one element selected from the group consisting of Al, Mg, Ni, Co, Fe, Cr, V, Ti, Cu, B, Ca, Zn, Zr, Nb, Mo, Sr, Sb, W, Ti, and Bi; and A is at least one monovalent or divalent anion.

More particularly, the lithium metal oxide may be represented by Formula 2 below:

$$Li_xNi_yMn_{2-y}O_4 \qquad (2)$$

wherein $0.9 \leq x \leq 1.2$ and $0.4 \leq y \leq 0.5$.

More particularly, the lithium metal oxide may be $LiNi_{0.5}Mn_{1.5}O_4$ or $LiNi_{0.4}Mn_{1.6}O_4$.

The anode may include, as an anode active material, a lithium metal oxide represented by Formula 3 below:

$$Li_aM'_bO_{4-c}A_c \qquad (3)$$

wherein M' is at least one element selected from the group consisting of Ti, Sn, Cu, Pb, Sb, Zn, Fe, In, Al, and Zr; $0.1 \leq a \leq 4$ and $0.2 \leq b \leq 4$ in which a and b are determined according to oxidation number of M'; $0 \leq c < 0.2$ in which c is determined according to oxidation number of A; and A is at least one monovalent or divalent anion.

The lithium metal oxide may be represented by Formula 4 below:

$$Li_aTi_bO_4 \qquad (4).$$

More particularly, the lithium metal oxide may be $Li_{1.33}Ti_{1.67}O_4$ or $LiTi_2O_4$.

The cathode is manufactured by coating a cathode active material on a cathode current collector and drying and pressing the coated cathode current collector. As desired, a conductive material, a binder, a filler, and the like as described above may be further selectively used in addition to the cathode active material.

The cathode current collector is generally fabricated to a thickness of 3 to 500 μm. The cathode current collector is not particularly limited so long as it does not cause chemical changes in the fabricated battery and has high conductivity. For example, the cathode current collector may be made of stainless steel, aluminum, nickel, titanium, sintered carbon, or aluminum or stainless steel surface-treated with carbon, nickel, titanium, silver, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

As the cathode active material, the materials as defined above may be used. In addition, examples of the cathode active material may include, but are not limited to, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_{2-x}O_4$ where $0 \leq x \leq 0.33$, $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides having the formula $LiNi_{1-x}M_xO_2$ where M=Co, Mn, Al, Cu, Fe, Mg, B, or Ga, and $0.01 \leq x \leq 0.3$; lithium manganese composite oxides having the formula $LiMn_{2-x}M_xO_2$ where M=Co, Ni, Fe, Cr, Zn, or Ta, and $0.01 \leq x \leq 0.1$ or the formula $Li_2Mn_3MO_8$ where M=Fe, Co, Ni, Cu, or Zn; spinel-structure lithium manganese composite oxides having the formula $LiNi_xMn_{2-x}O_4$ where $0.01 \leq x \leq 0.6$; $LiMn_2O_4$ where some of the Li atoms are substituted with alkaline earth metal ions; disulfide compounds; and $Fe_2(MoO_4)_3$.

The conductive material is typically added in an amount of 1 to 50 wt % based on the total weight of a mixture including a cathode active material. There is no particular limit as to the conductive material, so long as it does not cause chemical changes in the fabricated battery and has conductivity. Examples of conductive materials include, but are not limited to, graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between an active material and a conductive material and in binding of the active material to a current collector. The anode binder may be typically added in an amount of 1 to 50 wt % based on a total weight of a mixture including a cathode active material. Examples of the binder include, but are not limtied to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene-butadiene rubber, fluorine rubber, and various copolymers.

The filler is optionally used as a component to inhibit cathode expansion. The filler is not particularly limited so long as it is a fibrous material that does not cause chemical changes in the fabricated secondary battery. Examples of the filler include olefin-based polymers such as polyethylene and polypropylene; and fibrous materials such as glass fiber and carbon fiber.

On the other hand, the anode is manufactured by coating an anode active material on an anode current collector and drying and pressing the coated anode current collector. As described, a conductive material, a binder, a filler, and the like as described above may be further selectively used in addition to the anode active material.

The anode current collector is generally fabricated to a thickness of 3 to 500 μm. The cathode current collector is not particularly limited so long as it does not cause chemical changes in the fabricated battery and has conductivity. For example, the anode current collector may be made of copper, stainless steel, aluminum, nickel, titanium, sintered carbon, copper or stainless steel surface-treated with carbon, nickel, titanium, silver, or the like, or aluminum-cadmium alloys. Similar to the cathode current collector, the anode current collector may also have fine irregularities at a surface thereof to increase adhesion between the anode active material and the anode current collector. In addition, the anode current collector may be used in any of various forms including films, sheets, foils, nets, porous structures, foams, and non-woven fabrics.

Examples of the anode active material include, but are not limited to, carbon such as hard carbon and graphite-based carbon; metal composite oxides such as $Li_xFe_2O_3$ where $0 \leq x \leq 1$, $Li_xWO_2$ where $0 \leq x \leq 1$, $Sn_xMe_{1-x}Me'_yO_z$ where Me: Mn, Fe, Pb, or Ge; Me': Al, B, P, Si, Groups I, II and III elements, or halogens; $0 < x \leq 1$; $1 \leq y \leq 3$; and $1 \leq z \leq 8$; lithium metals; lithium alloys; silicon-based alloys; tin-based alloys; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; conductive polymers such as polyacetylene; Li—Co—Ni-based materials; titanium oxides; lithium titanium oxides.

In an embodiment, when lithium titanium oxide (LTO) is used as the anode active material, LTO has low electrical conductivity and thus may have the electrode structure described above. In addition, in this case, due to high potential of LTO, a spinel lithium manganese composition oxide having relatively high potential, such as $LiNi_xMn_{2-x}O_4$ where $0.01 \leq x \leq 0.6$, may be used as the cathode active material.

In addition, the present invention provides a secondary battery in which an electrode assembly including the cathode, the anode, and a separator disposed therebetween is impregnated with a lithium salt-containing electrolyte.

The separator is disposed between the cathode and the anode and an insulating thin film having high ion permeability and mechanical strength is used as the separator. The separator typically has a pore diameter of 0.01 to 10 μm and a thickness of 5 to 300 μm. As the separator, sheets or non-woven fabrics made of an olefin polymer such as polypropylene, glass fibers or polyethylene, which have chemical resistance and hydrophobicity, are used. When a solid electrolyte such as a polymer is employed as the electrolyte, the solid electrolyte may also serve as a separator.

The lithium salt-containing electrolyte is composed of an electrolyte and a lithium salt. As the electrolyte, a non-aqueous organic solvent, an organic solid electrolyte, an inorganic solid electrolyte, or the like may be used.

For example, the non-aqueous organic solvent may be an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the non-aqueous electrolyte. Examples thereof include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), or the like.

In an embodiment, a lithium salt-containing non-aqueous electrolyte may be prepared by adding a lithium salt such as $LiPF_6$, $LiClO_4$, $LiBF_4$, $LiN(SO_2CF_3)_2$, or the like to a mixed solvent of a cyclic carbonate such as EC or PC, which is a high dielectric solvent, and a linear carbonate such as DEC, DMC, or EMC, which is a low-viscosity solvent.

The present invention also provides a battery module including the secondary battery as a unit battery and a battery pack including the battery module.

The battery pack may be used as a power source of medium and large devices that require high-temperature stability, long cycle characteristics, high rate characteristics, and the like.

Examples of the medium and large devices include, but are not limited to, electric motor-driven power tools; electric vehicles (EVs), hybrid electric vehicles (HEVs), and plug-in hybrid electric vehicles (PHEVs); electric two-wheeled vehicles such as e-bikes and e-scooters; electric golf carts; and systems for storing power.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a scanning electron microscopy (SEM) image showing a surface of a current collector used in Example 1; and FIG. 2 is an SEM image showing a surface of a current collector used in Comparative Example 1.

MODE FOR INVENTION

EXAMPLE 1

To form a surface roughness $R_a$ of 0.5 μm on a surface of an Al current collector, a surface of the Al current collector was etched using an etchant prepared by mixing $FeCl_3$ with a 2.4 M aqueous HCl solution to a final concentration of 0.4 M. Subsequently, 95 wt % of $Li_{1.33}Ti_{1.67}O_4$ as an anode active material, 2.5 wt % of Super-P as a conductive material, and 2.5 wt % of PVdF as a binder were added to NMP to prepare an anode mixture and the prepared anode mixture was coated onto the Al current collector, thereby completing fabrication of an anode for secondary batteries.

COMPARATIVE EXAMPLE 1

An anode for secondary batteries was manufactured in the same manner as in Example 1, except that the Al current collector was not surface-treated using an etchant.

EXPERIMENTAL EXAMPLE 1

Scanning electron microscopy (SEM) images of surfaces of the current collectors according to Example 1 and Comparative Example 1 are illustrated in FIGS. 1 and 2, respectively.

Referring to FIGS. 1 and 2, it can be confirmed that the current collector of Example I illustrated in FIG. 1 has a rough surface morphology, while the current collector of Comparative Example I illustrated in FIG. 2 has a smooth surface.

EXPERIMENTAL EXAMPLE 2

Adhesive strength of each of the anodes manufactured according to Example 1 and Comparative Example 1 was measured. Results are shown in Table 1 below.

TABLE 1

|  | Adhesive strength (gf/cm) |
| --- | --- |
| Example 1 | 47 |
| Comparative Example 1 | 36 |

As shown in Table 1 above, it can be confirmed that the anode of

Example 1 manufactured using the current collector surface-treated using an etchant exhibits enhanced adhesive strength as compared to the anode of Comparative Example 1 and, consequently, performance of a battery including the anode of Example 1 is enhanced.

INDUSTRIAL APPLICABILITY

As described above, a method of manufacturing an electrode for secondary batteries according to the present invention includes surface-treating a current collector by chemical or electrical etching using a wet method or by reactive gas or ion etching using a dry method so as to have a particular morphology over the entire surface thereof and thus may increase a surface area of the current collector and, accordingly, adhesion between the current collector and an electrode active material is enhanced, whereby overall performance of a secondary battery, such as charging and discharging cycle characteristics and the like, may be enhanced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of manufacturing an electrode for secondary batteries, the method comprising preparing an electrode mixture in the form of a slurry by mixing an electrode active material comprising a lithium metal oxide represented by Formula 1 below:

$$Li_xNi_yMn_{2-y}O_4 \quad (1)$$

wherein $0.9 \leq x \leq 1.2$, $0.4 < y < 0.5$, a conductive material, a binder and an organic solvent, surface-treating a current collector so as to have a morphology wherein a surface roughness $R_a$ of 0.1 μm to 1 μm is formed over an entire surface thereof, wherein the surface-treating is performed by chemical etching using a mixture of FeCl3/HCl/H2O as an etchant to enhance adhesion between the electrode active material and the current collector, and coating the slurry onto the surface-treated surface of the current collector.

2. An electrode for a secondary battery, manufactured using the method according to claim 1.

3. The method according to claim 1, wherein the lithium metal oxide for the electrode active material is $LiNi_{0.5}Mn_{1.5}O_4$ or $LiNi_{0.4}Mn_{1.6}O_4$.

4. The method according to claim 1, wherein the lithium metal oxide for the electrode active material is $Li_{1.33}Ti_{1.67}O_4$ or $LiTi_2O_4$.

5. A secondary battery comprising the electrode according to claim 2.

6. The secondary battery according to claim 5, wherein the secondary battery is a lithium secondary battery.

7. A battery module comprising the secondary battery according to claim 6 as a unit battery.

8. A battery pack comprising the battery module according to claim 7.

9. A device comprising the battery pack according to claim 8.

10. The device according to claim 9, wherein the device is an electric vehicle, a hybrid electric vehicle, a plug-in hybrid electric vehicle, or a system for storing power.

* * * * *